US008438542B2

(12) United States Patent
Nandan et al.

(10) Patent No.: US 8,438,542 B2
(45) Date of Patent: May 7, 2013

(54) GENERATING A MANAGEMENT PACK AT PROGRAM BUILD TIME

(75) Inventors: Durgesh Nandan, Redmond, WA (US);
Shuyi Hu, Bothell, WA (US);
Cheng-Chang Chang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1540 days.

(21) Appl. No.: 11/957,586

(22) Filed: Dec. 17, 2007

(65) Prior Publication Data

US 2009/0158241 A1 Jun. 18, 2009

(51) Int. Cl.
*G06F 9/44* (2006.01)

(52) U.S. Cl.
USPC ........... 717/121; 717/104; 717/106; 717/120; 717/122; 717/123

(58) Field of Classification Search ........... 717/104–106
See application file for complete search history.

(56) References Cited

U.S. PATENT DOCUMENTS

| | | | |
|---|---|---|---|
| 6,026,235 A | 2/2000 | Shaughnessy | |
| 6,167,358 A | 12/2000 | Othmer et al. | |
| 6,654,801 B2 | 11/2003 | Mann et al. | |
| 7,028,225 B2 | 4/2006 | Maso et al. | |
| 2005/0138111 A1* | 6/2005 | Aton et al. | 709/201 |
| 2005/0193375 A1 | 9/2005 | Larson | |
| 2005/0278703 A1 | 12/2005 | Lo et al. | |
| 2006/0020924 A1 | 1/2006 | Lo et al. | |
| 2006/0026570 A1 | 2/2006 | Chan et al. | |
| 2006/0112314 A1 | 5/2006 | Soto | |
| 2007/0240118 A1 | 10/2007 | Keren | |
| 2008/0155517 A1* | 6/2008 | Yan et al. | 717/140 |

OTHER PUBLICATIONS

"Management Pack for Exchange Server 2007 for MOM 2005", Microsoft Corporation, 2007, pp. 1-2.
"Automated Software Application Testing Tools Eggplant Purple", Redstone Software Inc., 2007, pp. 1-3.
"Software Testing", Olive Middle East, pp. 1-3.
Ghosh, et al., "An Approach to Testing COTS Software for Robustness to Operating System Exceptions and Errors", Proceedings of the 10th International Symposium on Software Reliability Engineering, IEEE Computer Society 1999, pp. 9.
"Software Testing", Olive Middle East, downloaded Oct. 19, 2007 from pp. 1-3.

* cited by examiner

*Primary Examiner* — Li B Zhen
*Assistant Examiner* — Lenin Paulino
(74) *Attorney, Agent, or Firm* — Hope Baldauff Hartman, LLC (57) ABSTRACT

Technologies are described herein for generating a management pack at program build time. Data is received that defines one or more events generated by the application program. Data is also received that defines one or more management classes for the application program. When a request to build the program is received, the data defining the events generated by the program and the data defining the management classes is utilized to generate a management pack for the program in an automated fashion. Once the management pack has been generated, it may be provided to an operations manager application program for use in monitoring the operation of the application program.

17 Claims, 4 Drawing Sheets

GENERATING A MANAGEMENT PACK AT PROGRAM BUILD TIME

BACKGROUND

Operations manager application programs are software tools that allow a computer system administrator to monitor and administer computer systems and software applications. Operations manager application programs typically consume rules and configuration information that is utilized to monitor the operation of technology component in the form of a management pack. For instance, a management pack may provide data to discover, monitor, troubleshoot, report on, and resolve problems for a specific technology component. A management pack may also include health models to analyze the performance, availability, configuration, and security inputs of a technology component, as well as the status of related components, to determine the overall status of a technology component.

Management packs are generally created individually for each technology component. For instance, with respect to a suite of application programs, the management pack for each application program in the program suite would be developed independently. As a result, it can be difficult for software developers to enforce consistency and quality development of management packs across multiple application programs developed by an organization. Moreover, management packs can be difficult to create and are generally created after development of a technology component has concluded. As a result, the quality and consistency of management packs may suffer and, consequently, it may not be possible to monitor the operation of the related technology components in the most effective way.

It is with respect to these considerations and others that the disclosure made herein is presented.

SUMMARY

Technologies are described herein for generating a management pack at program build time. In particular, through the concepts and technologies presented herein, a management pack for an application program is generated programmatically at the time the application program is built. By generated the management pack for an application program in an automated fashion as described herein, much of the difficulty and tedium previously associated with creating a management pack can be eliminated.

According to one aspect presented herein, a management pack for an application program is generated in an automated fashion at the time the program is built. In particular, data is received that defines one or more events generated by the application program. In one implementation, this data is received in the form of a uniform logging service ("ULS") manifest. Data is also received that defines one or more management classes for the application program. For instance, this data may specify management rules, management tasks, performance counters, and data for discovering instances of the various management classes. This data is specified in a source extensible markup language ("XML") file through the use of a simplified XML schema for providing management information.

When a request to build the program is received, the data defining the events generated by the program and the data defining the management classes is utilized to generate a management pack for the program in an automated fashion. In one implementation, a ULS manifest translator is executed to translate the data defining the events generated by the program to an object model specified using the service modeling language ("SML"). A source XML translator is also executed to translate the data defining the management classes for the program into the object model. The ULS manifest translator and the source XML translator may utilize one or more application programming interfaces ("APIs") implemented by a management pack engine to translate the data to the object model.

According to other aspects, a management pack compiler may be executed to read the object model expressed using SML and to compile the model into a management pack for the application program. The management pack compiler may also utilize APIs implemented by the management pack engine. Once the management pack has been generated, it may be provided to an operations manager application program for use in monitoring the operation of the application program.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for generating a management pack at program build time. Through the use of the technologies and concepts presented herein, a management pack for consumption by an operations manager application is generated in an automated fashion at the time an application program is built. In this manner, generation of management packs for software components becomes an integral but automated part of the program development cycle, rather than an afterthought following the completion of the program development cycle.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for generating a management pack at program build time will be described.

Figure 1:
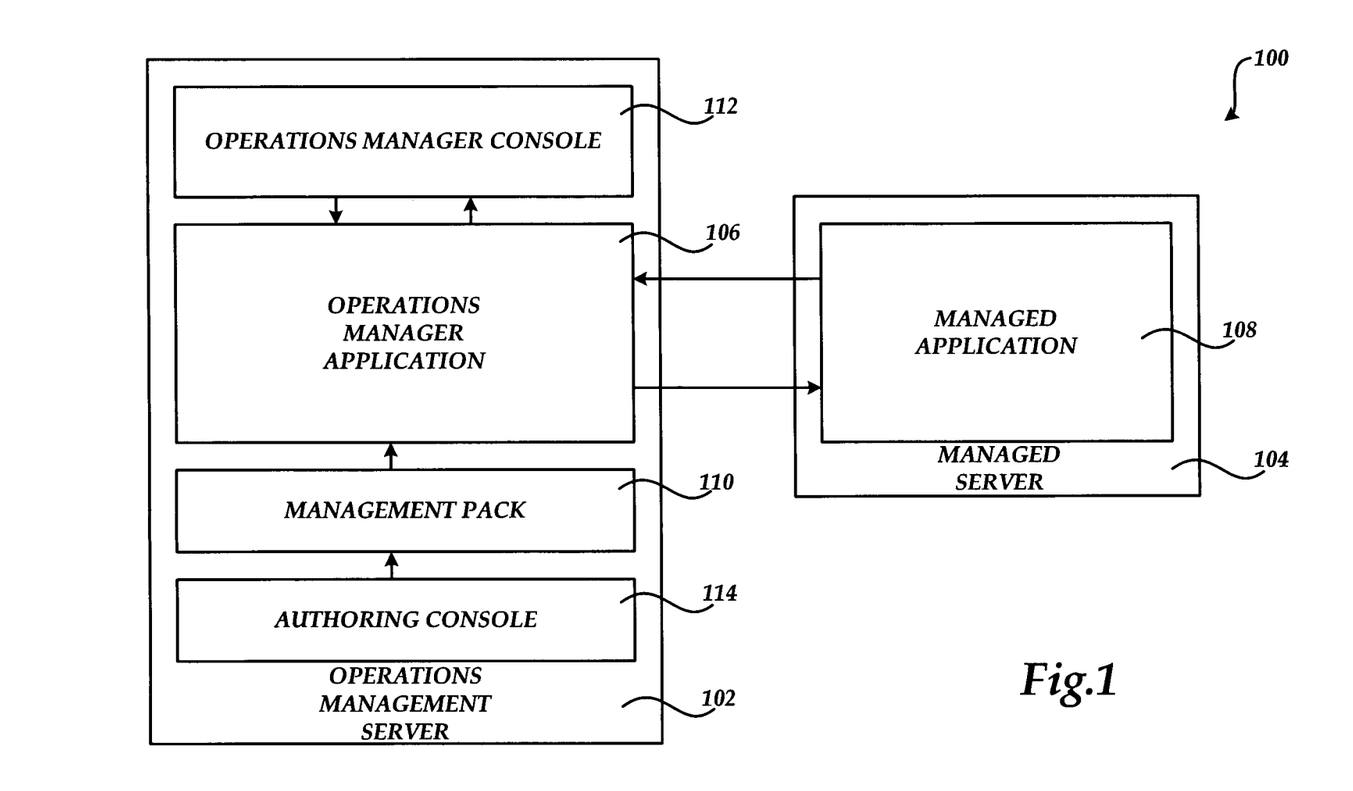
FIG. 1 is a network and software architecture diagram showing an illustrative operating environment for embodiments presented herein.

Turning now to FIG. 1, details will be provided regarding an illustrative operating environment for the embodiments presented herein. In particular, FIG. 1 shows a computing system 100 that provides functionality for monitoring the operation of a managed application 108 (the managed application 108 may be referred to herein as an "application program," an "application," or simply a "program"). In one implementation, the system 100 includes an operations management server 102 and a managed server 104. Although not illustrated in FIG. 1, the operations management server 102 and the managed server 104 are interconnected through one or more local and wide area networks. It should be appreciated that although only one managed server 104 and one operations management server 102 have been illustrated in FIG. 1, additional managed servers 104 and operations management servers 102 may be utilized.

The operations management server 102 illustrated in FIG. 1 comprises a standard server computer capable of executing an operating system and one or more programs. In particular, according to embodiments the operations management server 102 is operative to execute an operations manager application 106, an operations manager console 112, and an authoring console 114. The operations manager application 106 is a software program that provides functionality for monitoring the operation of one or more technology components. A technology component may comprise a program, like the managed application 108, or a device, like the managed server 104. In this regard, the operations manager application 106 may be configured to monitor the resource usage, performance, health, and other characteristics of the operation of a technology component.

The operations manager console 112 operates in conjunction with the operations manager application 106 to provide a user interface for configuring the operation of the operations manager application 106 and for receiving information regarding the operational status of various technology components. According to one implementation, the operations manager application 106 comprises the SYSTEM CENTER OPERATIONS MANAGER operations manager application program from MICROSOFT CORPORATION of Redmond, Wash. It should be appreciated, however, that the implementations presented herein may be utilized with operations manager application programs from other vendors.

In order to monitor the operation of technology components, like the managed application 108 and the managed server 104, the operations manager application 106 consumes rules and configuration information for monitoring the operation of a technology component in the form of a management pack 110. The management pack 110 ("MP") is a document that provides data to discover, monitor, troubleshoot, report on, and resolve problems for a specific technology component. MPs may also include health models to analyze the performance, availability, configuration, and security inputs, as well as the status of related components, to determine the overall status of a technology component. Although only one MP 110 is illustrated in FIG. 1, a separate MP may be provided for each managed technology component.

In one implementation, the MP 110 is an XML document used to provide monitoring settings to the operations manager application 106. For instance, the MP 110 may contain definitions of the different components in a software technology component, such as the managed application 108, or a hardware technology component, like the managed server 104, and the information needed by an administrator who operates the software or hardware. In general, the data contained within a MP 110 transfers knowledge gained during the development cycle of an application, device, or service and makes that knowledge available to the administrators that are tasked with the day-to-day operations of the application, device, or service. Multiple MPs may be stored in an operations database (not shown) utilized by the operations manager application 106.

According to implementations, the MP 110 may include data defining one or more management classes. Management classes define the type of applications, devices, or objects that will be discovered and monitored by the operations manager application 106. Data may also be supplied in the MP 110 that defines relationships between various management classes. Data defining how instances of each of the management classes are discovered may also be provided. Management rules and management tasks may also be specified. Rules are defined for various purposes, such as collecting events, creating performance data, and generating alerts. Management tasks define actions to be taken based on the detection of certain conditions. Key properties may also be specified for each management class.

The authoring console 114 is another software component that executes on the operations management server 102. The authoring console 114 provides functionality for allowing a user to create a management pack 110. As discussed briefly above, however, the process of creation of management packs through the use of an authoring console 114 suffers from several significant drawbacks. The embodiments presented herein allow the creation of a management pack 110 for the managed application 108 at build time of the managed application 108. As known in the art, performing a software build is the process of converting source code into an executable program. As used herein, therefore, the term "build time" refers to the time at which a software build is performed. Details regarding the various processes for generating a management pack at the build time of the application 108 are provided below with respect to FIGS. 2-4.

Figure 2:
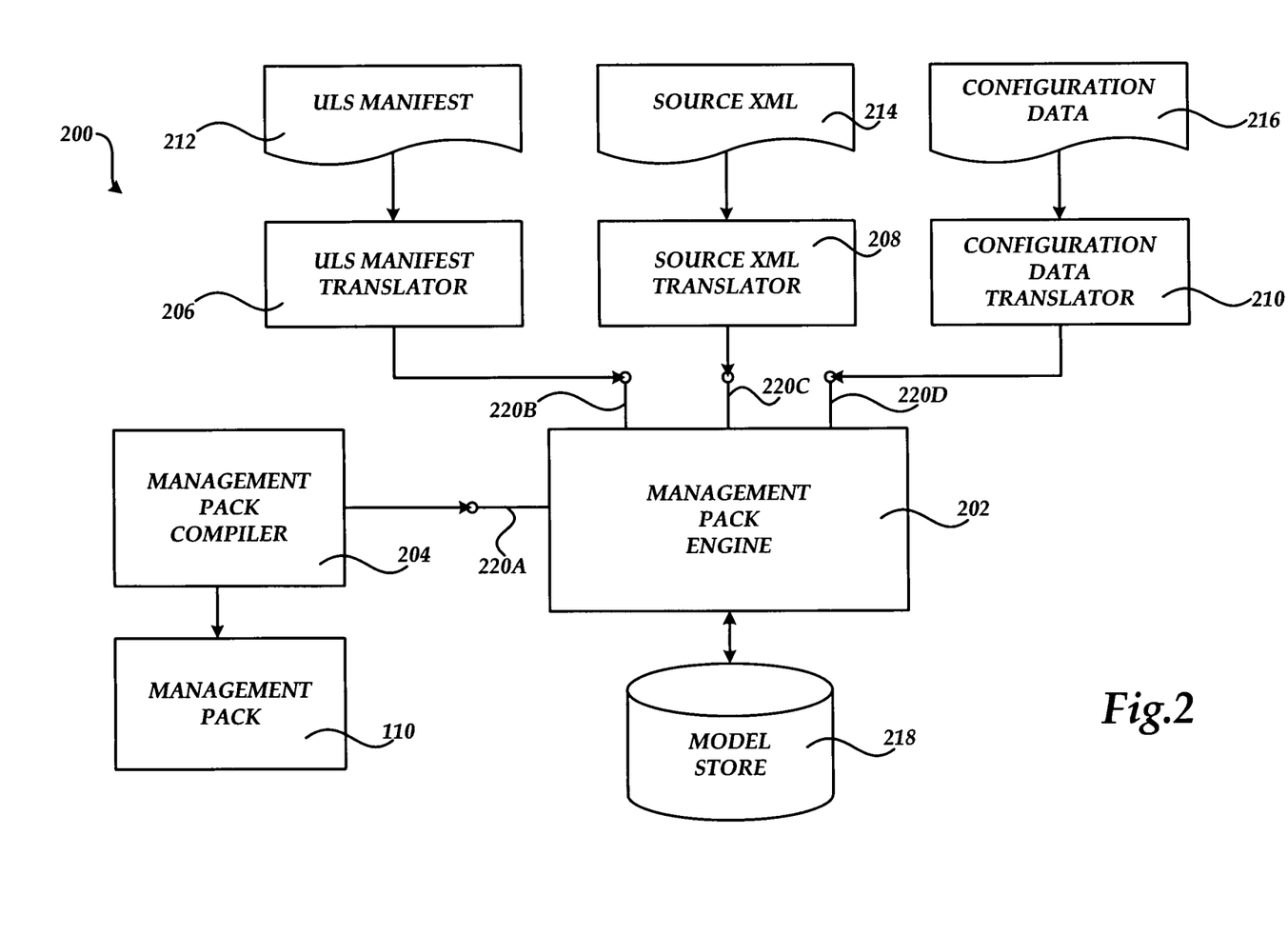
FIG. 2 is a software architecture diagram showing aspects of several software components provided herein for generating a management pack at program build time in one embodiment.

Referring now to FIG. 2, additional details will be provided regarding the embodiments presented here for generating a management pack at program build time. In particular, FIG. 2 shows a software architecture 200 capable of generating a management pack 110 for the application 108 at the build time of the application 108. According to embodiments, the software architecture 200 includes data that defines events generated by the application 108. In particular, in one implementation, this data is specified in the form of a ULS manifest 212. The ULS manifest 212 contains data describing all of the events generated by the application program 108. The ULS manifest may also contain data identifying the performance counters created by the application program. As known in the art, the Unified Logging Service is an API that allows developers to send notifications to event and trace logs, to manipulate performance monitor counters, and to use other facilities to send performance data to developer of the application 108.

According to other aspects, the software architecture 200 also includes data that defines one or more management classes for the application program 108. In particular, the developer of the application 108 generates the source XML file 214 prior to the build time of the application 108. The source XML file 214 contains XML that describes all of the management class definitions for the MP 110 and is expressed using a schema that is simplified when compared to the schema used to define the MP 110. By using an easy-to-understand XML schema, the source XML file 214 abstracts developers from the complexity underlying the MP 110.

According to embodiments, the source XML file 214 can be divided into multiple physical files for a single MP 110. According to implementations, the source XML file 214 may also include XML data defining the relationships between the various management classes, data defining one or more performance counters, data defining how instances of each of the classes are discovered, and data defining management rules and management tasks. In other implementations, configuration data 216 may also be specified. The configuration data 216 provides configuration information to the operations manager application 106 for monitoring the operation of the application 108.

According to various implementations, the software architecture 200 also includes a ULS manifest translator 206, a source XML translator 208, and a configuration data translator 210. As will be described in greater detail below, these components make API calls to a management pack engine 202 to convert the contents of the ULS manifest 212, the source XML file 214, and the configuration data 216, respectively, into XML that can be utilized by the management pack compiler 204. As shown in FIG. 2, there is one translator for each type of input in one implementation. For instance, in this implementation, there is a translator 206 for the ULS manifest 212 and a separate translator 208 for the source XML file 214. In alternative embodiments, a single translator may be utilized.

The ULS manifest translator 206 is an executable component that translates the data contained in the ULS manifest 212 into a format that can be consumed by the management pack engine 202. The ULS manifest translator 206 then calls the API 220B on the management pack engine to submit the data. As will be described in greater detail below, through this process the data contained in the ULS manifest 212 is converted to a management object model stored by the management pack engine 202 in the model store 218. In one implementation, the object model is specified and stored in the model store 218 using the service modeling language ("SML"). SML is an XML-based specification that defines a consistent way to model complex information technology ("IT") services and systems. For instance, SML may be utilized to model the structure, constraints, policies, and best practices of IT services and systems.

According to implementations, the source XML translator 208 is an executable component that transforms the data contained in the source XML file 214 into the management object model stored by the management pack engine 202. The source XML translator 208 utilizes the API 220C exposed by the management pack engine 202 to store the converted data in the model store 218. As discussed above, the data contained in the source XML 214 is converted into SML and stored in the model store 218 through this process. In a similar manner, the configuration data translator 210 translates the configuration data 216 into SML and stores the translated data in the model store 218 through calls to the API 220D implemented by the management pack engine 202.

The management pack engine 202 is an object model that exposes the application programming interfaces 220B, 220C, and 220D for consumption by the ULS manifest translator 206, the source XML translator 208, and the configuration data translator 210, respectively. The management pack engine 202 also exposes an application programming interface 220A for consumption by the management pack compiler 204. Through the interface 220A, the management pack compiler 204 takes various SML models stored by the management pack engine 202 in the model store 218 and processes the SML models to translate them into an appropriate management pack 110 for the application 108. This occurs at the build time of the application 108. In this way, the management pack compiler 204 processes and consumes the management object models created by the management pack engine 202 to create the management pack 110 at the build time of the application 108. Additional details regarding this process are provided below with respect to FIG. 3.

Figure 3:
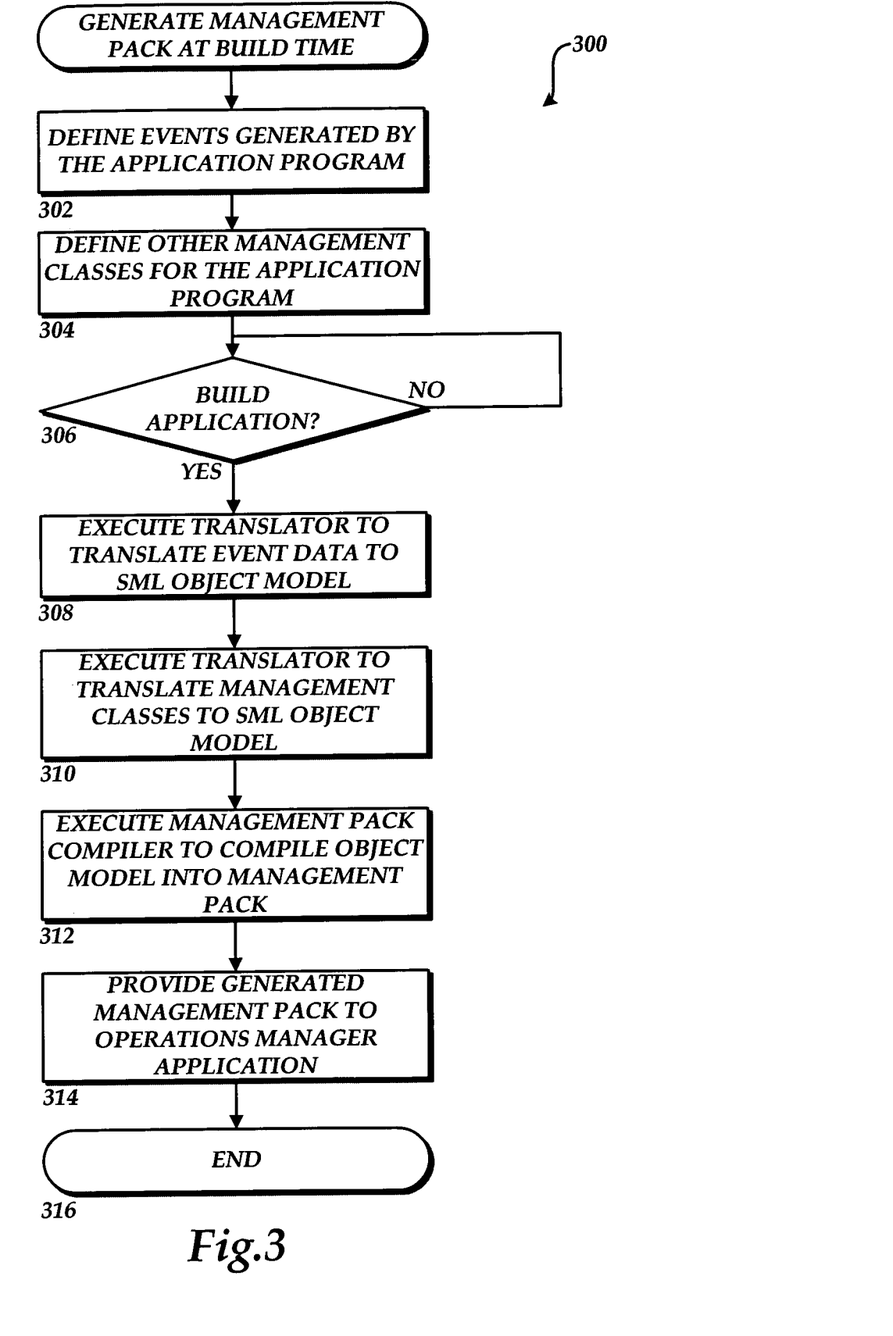
FIG. 3 is a flow diagram showing an illustrative process for generating a management pack at program build time in one embodiment.

Referring now to FIG. 3, additional details will be provided regarding the embodiments presented herein for generating a management pack at program build time. In particular, FIG. 3 is a flow diagram showing an illustrative process for generating a management pack at program build time. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at operation 302, where the events generated by the application 108 are defined. As discussed above, the ULS manifest 212 is utilized in one implementation to define the events generated by the application 108. Other data types and formats may be similarly utilized to define the events generated by the application 108.

From operation 302, the routine 300 continues to operation 304, where the management classes utilized by the application program 108 are defined. As discussed above, the source XML file 214 is generated in one implementation to define the management classes. As also described above, the source XML file 214 may also include other data for use in the management pack 110, such as data defining the relationships between the various management classes, data defining one or more performance counters, data defining how instances of each of the classes are discovered, and data defining management rules and management tasks.

From operation 304, the routine 300 continues to operation 306, where a determination is made as to whether a request has been received to build the application program 108. If no such request has been received, the routine 300 returns to operation 306 where another determination is made. In response to a build request being received, the routine 300 continues from operation 306 to operation 308.

At operation 308, the ULS manifest translator 206 is executed to translate the data defining the events generated by the application program 108 stored in the ULS manifest 212 into the SML object model utilized by the management pack engine 202. As discussed above, the ULS manifest translator 206 may call the API 220B implemented by the management pack engine 202 to cause the translated event data to be stored in the model store 218.

From operation 308, the routine 300 continues to operation 310, where the source XML translator 208 is executed to translate the data defining the management classes for the application 108 and the other data set forth in the source XML file 214 into the SML object model utilized by the management pack engine 202. The source XML translator 208 may call the API 220C implemented by the management pack engine 202 to cause the translated data to be stored in the model store 218. The configuration data translator 210 may also be executed in a similar manner to translate the configuration data 216 and to cause the translated data to be stored in the model store 218.

From operation 310, the routine 300 continues to operation 312, where the management pack compiler 204 is executed. The management pack compiler 204 reads the SML models stored by the management pack engine 202 in the model store 218 and processes the SML models to translate them into an appropriate management pack 110 for the application 108. The routine 300 then continues to operation 314, where the generated management pack 110 is provided to the operations manager application 106 for consumption and use in monitoring the operation of the application 108. From operation 314, the routine 300 continues to operation 316, where it ends.

Figure 4:
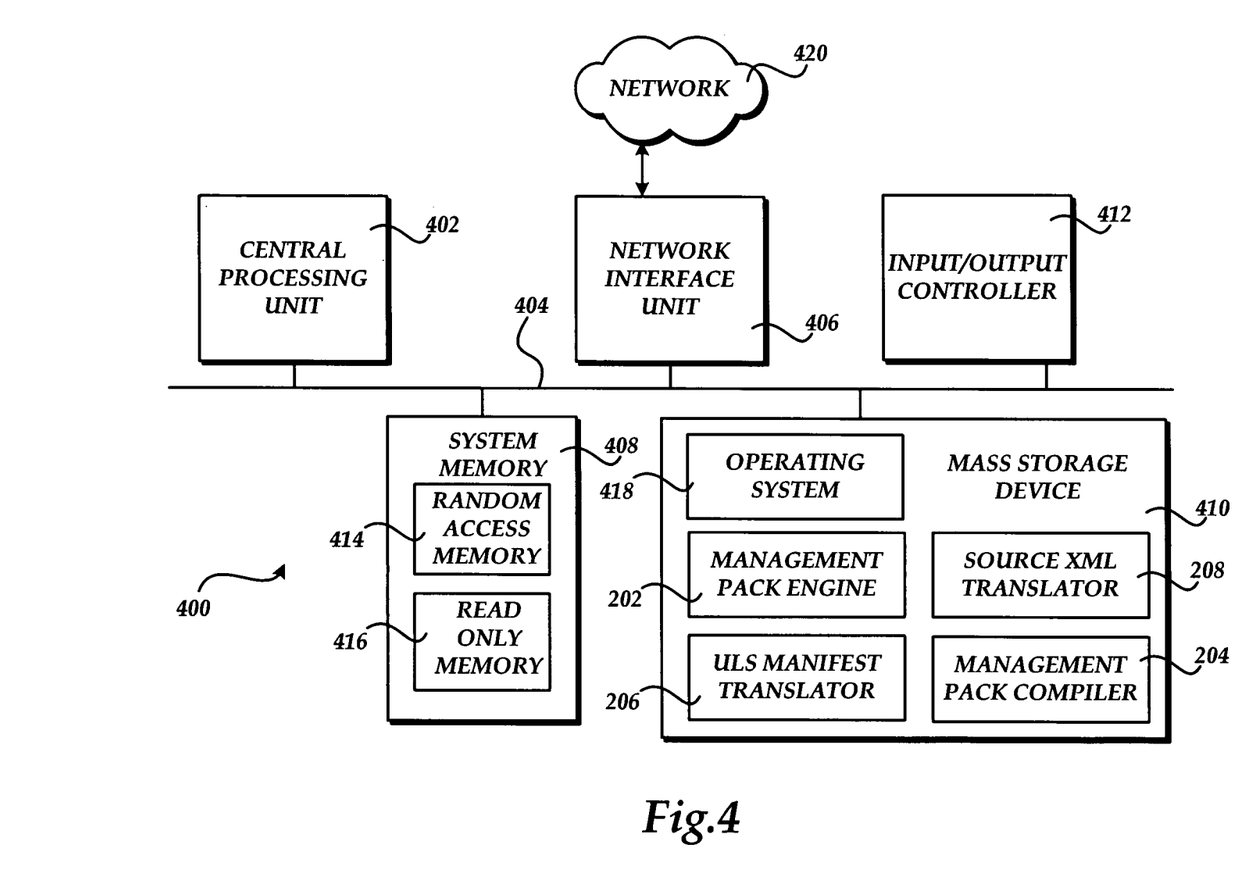
FIG. 4 is a computer architecture diagram showing an illustrative computer hardware and software architecture for a computing system capable of implementing aspects of the embodiments presented herein.

FIG. 4 shows an illustrative computer architecture for a computer 400 capable of executing the software components described herein for generating a management pack at program build time in the manner presented above. The computer architecture shown in FIG. 4 illustrates a conventional desktop, laptop, or server computer and may be utilized to execute any aspects of the software components presented herein described as executing on the operations management server 102, the managed server 104, or a computer configured for development of the application 108.

The computer architecture shown in FIG. 4 includes a central processing unit 402 ("CPU"), a system memory 408, including a random access memory 414 ("RAM") and a read-only memory ("ROM") 416, and a system bus 404 that couples the memory to the CPU 402. A basic input/output system containing the basic routines that help to transfer information between elements within the computer 400, such as during startup, is stored in the ROM 416. The computer 400 further includes a mass storage device 410 for storing an operating system 418, application programs, and other program modules, which are described in greater detail herein.

The mass storage device 410 is connected to the CPU 402 through a mass storage controller (not shown) connected to the bus 404. The mass storage device 410 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available computer storage media that can be accessed by the computer 400.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network such as the network 420. The computer 400 may connect to the network 420 through a network interface unit 406 connected to the bus 404. It should be appreciated that the network interface unit 406 may also be utilized to connect to other types of networks and remote computer systems. The computer 400 may also include an input/output controller 412 for receiving and processing input from a number of other devices, including a keyboard, mouse, or electronic stylus (not shown in FIG. 4). Similarly, an input/output controller may provide output to a display screen, a printer, or other type of output device (also not shown in FIG. 4).

As mentioned briefly above, a number of program modules and data files may be stored in the mass storage device 410 and RAM 414 of the computer 400, including an operating system 418 suitable for controlling the operation of a networked desktop, laptop, or server computer. The mass storage device 410 and RAM 414 may also store one or more program modules. In particular, the mass storage device 410 and the RAM 414 may store the management pack engine 202, the ULS manifest translator 206, the source XML translator 208, and the management pack compiler 204, each of which was described in detail above with respect to FIGS. 1-3. The mass storage device 410 and the RAM 414 may also store other types of program modules.

Based on the foregoing, it should be appreciated that technologies for generating a management pack at application program build time are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for generating a management pack for use in monitoring the operation of an application program, the method comprising:
   receiving data defining one or more events to be generated by the application program;
   receiving data defining one or more management classes for the application program;
   receiving a request to build the application program; and
   in response to receiving the request, using the data defining the one or more events generated by the application program and the data defining the one or more management classes to generate the management pack further comprises executing a first translator to translate the data defining the one or more events generated by the application program to an object model specified using a service modeling language (SML), wherein the first translator is further configured to call an application programming interface (API) exposed by a management pack engine to translate the data defining the one or more events generated by the application program to the object model specified using a SML, executing a second translator to translate the data defining the one or more management classes for the application program to the object model specified using the SML, wherein the second translator is further configured to call an API exposed by a management pack engine to translate the data defining the one or more management classes for the application program to the object model specified using the SML, executing the management pack engine operative to implement the API and to maintain a model store for storing the model expressed using the SML, and executing a management pack compiler configured to read the model expressed using the SML and to compile the model into the management pack.

2. The method of claim 1, wherein the management pack comprises data consumable by an operations manager application program to monitor the operation of the application program.

3. The method of claim 1, wherein the data defining the one or more events generated by the application program comprises a unified logging service (ULS) manifest.

4. The method of claim 1, wherein the data defining the one or more management classes for the application program comprises an extensible markup language (XML) file that defines the management classes using XML.

5. A computer system for generating a management pack for use in monitoring the operation of an application program, the computer system comprising:

a first translator configured to execute on a processor in the computer system configured to read a manifest comprising data defining one or more events to be generated by the application program and to call an application programming interface (API) exposed by a management pack engine at a build time of the application program to convert the data of the manifest into a model expressed using a service modeling language (SML);

a second translator configured to execute on the processor in the computer system and read a source extensible markup language (XML) file comprising XML data defining one or more management classes for the application program and to call the API at the build time of the application program to convert the XML data of the source XML file into the model expressed using the SML;

the management pack engine operative to implement the API and to maintain a model store for storing in a memory of the computer system the model expressed using the SML; and a management pack compiler configured to read the model expressed using the SML from the model store using the API and to execute at the build time to compile the model into the management pack.

6. The system of claim 5, further comprising an operations manager application configured to utilize the management pack to monitor the operation of the application program.

7. The system of claim 5, wherein the XML data contained in the source XML file further defines one or more management rules.

8. The system of claim 5, wherein the XML data contained in the source XML file further defines one or more management tasks.

9. The system of claim 5, wherein the XML data contained in the source XML file further defines data for use in discovering instances of the one or more management classes.

10. The system of claim 5, wherein the manifest further comprises data defining one or more performance counters for the application program.

11. The system of claim 5, wherein the manifest comprises a unified logging service (ULS) manifest.

12. The system of claim 11, wherein the first translator comprises a ULS manifest translator configured to read the ULS manifest and to call the API exposed by the management pack engine to convert the ULS manifest into the model expressed using the SML.

13. A computer-readable medium that is not a signal having computer-executable instructions stored thereon which, when executed by a computer, cause the computer to:

generate a manifest, the manifest comprising data defining one or more events to be generated by an application program;

generate a source extensible markup language (XML) file, the source XML file comprising data defining one or more management classes for the application program; and execute a manifest translator configured to read the manifest and to call one or more application programming interfaces (APIs) exposed by a management pack engine to convert the data of the manifest into a model expressed using a service modeling language (SML), execute a source XML translator configured to read the source XML file and to call the APIs to convert the data of the source XML file into the model expressed using the SML, execute the management pack engine operative to implement the API and to maintain a model store for storing in a memory of the computer the model expressed using the SML, and to execute a management pack compiler while performing a build of the application program, the management pack compiler configured to read the model expressed using the SML and to compile the model into a management pack for use by the operations manager application to monitor the operation of the application program.

14. The computer-readable medium of claim 13, wherein the XML data contained in the source XML file further defines one or more management rules, one or more management tasks, and data for use in discovering instances of the one or more management classes.

15. The computer-readable medium of claim 14, wherein the manifest comprises a unified logging service (ULS) manifest and wherein the ULS manifest further comprises data defining one or more performance counters for the application program.

16. The computer-readable medium of claim 15, having further computer executable instructions stored thereon which, when executed by the computer, cause the computer to execute an operations manager application configured to utilize the management pack to monitor the operation of the application program.

17. The computer-readable medium of claim 16, wherein the manifest translator comprises a ULS manifest translator configured to read the ULS manifest and to call the APIs exposed by the management pack engine to convert the ULS manifest into the model expressed using the SML.

* * * * *